United States Patent [19]
Wood

[11] 4,451,192
[45] May 29, 1984

[54] SILO UNLOADER

[76] Inventor: Jonathan G. Wood, Northbridge House, Chiddingfold, England

[21] Appl. No.: 229,600
[22] PCT Filed: May 9, 1980
[86] PCT No.: PCT/GB80/00086
§ 371 Date: Jan. 8, 1981
§ 102(e) Date: Jan. 8, 1981
[87] PCT Pub. No.: WO80/02416
PCT Pub. Date: Nov. 13, 1980

[30] Foreign Application Priority Data

May 9, 1979 [GB] United Kingdom ............... 7916082

[51] Int. Cl.³ .......................................... B65G 65/42
[52] U.S. Cl. ................................ 414/306; 198/616; 414/308
[58] Field of Search ............. 414/310, 306, 223, 224, 414/309, 308, 311, 312, 325, 326, 327; 198/631, 527, 863, 637, 657, 616, 556, 557, 558; 100/196, 198; 222/236, 411; 52/192, 197

[56] References Cited

U.S. PATENT DOCUMENTS

| 3,064,831 | 11/1962 | Cook | 414/310 |
| 3,076,567 | 2/1963 | O'Dell | 414/310 |
| 3,190,468 | 6/1965 | Kocher | 414/308 |
| 3,526,328 | 9/1970 | Garret et al. | 414/310 |
| 3,977,543 | 8/1976 | Weaver | 414/311 |
| 4,146,145 | 3/1979 | Easton | 414/310 |
| 4,286,909 | 9/1981 | Tingskog | 414/326 |

FOREIGN PATENT DOCUMENTS

| 438729 | 4/1968 | Australia . | |
| 451390 | 8/1971 | Australia . | |
| 1148942 | 3/1962 | Fed. Rep. of Germany . | |
| 1218355 | 6/1966 | Fed. Rep. of Germany | 414/310 |
| 1520775 | 3/1968 | France | 414/308 |
| 955786 | 10/1962 | United Kingdom . | |
| 1051232 | 6/1965 | United Kingdom . | |
| 1185121 | 3/1969 | United Kingdom . | |

Primary Examiner—Robert B. Reeves
Assistant Examiner—Donald Hajec
Attorney, Agent, or Firm—Murray Schaffer

[57] ABSTRACT

The combination of a storage silo and bottom unloader therefor wherein the base of the silo is formed as a hopper having a substantially central discharge outlet, the unloader being arranged to project into the silo through the discharge outlet and comprising a sweep arm pivoted for rotation in the hopper about a vertical axis disposed centrally of the discharge outlet and for vertical movement away from the surface of the hopper and means for varying the effective length of the arm comprising a mounting supporting the arm for pivotal movement about the centrally disposed vertical axis, the mounting arrangement being such that the length of the arm projecting into the silo can be altered.

11 Claims, 11 Drawing Figures

SILO UNLOADER

TECHNICAL FIELD

The invention relates to storage silos and to bottom unloaders for such storage silos.

BACKGROUND ART

Many bottom unloading devices for silos are known. For free flowing materials like dry grain, it is usually sufficient to open an outlet at the bottom of the silo and let grain flow out. The size of the outlet must however be sufficient to prevent the grain from forming a stable arch or dome over the outlet.

To enable a silo filled with granular material to empty under gravity it is usual to provide the silo with a hopper at its base with sides sloped at between 35° and 45° to the horizontal. Recently steep sided hoppers with a slope of 70° to 80° to the horizontal have been used to ensure "mass flow" conditions for the discharge of powders and the like.

There are some materials which, because they are fibrous and/or cohesive, show a marked reluctance to flow. These include silage, sawdust, seaweed, and soya meal. They can form a stable arch or dome over distances of several feet and occasionally across the whole diameter of a silo, although after a while the arch or dome usually collapses.

Known methods of bottom unloading non free-flowing materials are based on altering the properties of the material, e.g. fluidisation of cement or flour with air, or the use of an agitator or cutter to break down the stable arch and restart flow, e.g. vibrators, augers and chain cutters, or the use of a steep sided mass flow hopper.

The majority of bottom unloaders for silage and for the most intractable industrial materials have a central discharge outlet in the silo base fed by a centrally mounted sweep arm chain cutter or auger which undermines the material in the base of the silo and conveys the material to the discharge outlet. There are some in which a centrally mounted rotating flail forms a hopper in the material and undermines the arch. A disadvantage of existing radial auger or cutter unloaders is that they are relatively inaccessible for maintenance and repair.

When a silo is unloaded the distribution of pressures in the silo changes. The vertical friction wall load increases and the distribution of the lateral pressures changes with the formation of high local pressures where mass flows starts to converge and where the thrust from the arching of the dome reacts onto the wall.

The prediction of these pressures is not easy as their magnitude is very sensitive to the pattern of material flow in the silo and changes in that pattern due to varying material properties. However for central filling and unloading, e.g. so-called clock-hand type unloaders, reasonable estimates can be made for design. When the unloading is non-concentric as is the case with a side-mounted sweep arm unloader, the loads in the silo are not evenly distributed so that the wall of the silo tends to be forced out of round. The patterns of flow in the silo then become more complex and the development of stable arches harder to predict. As a result, the silo needs to be strongly constructed if it is not to be damaged in use.

We consider that an important feature in the design of an efficient bottom unloader is to arrange for the formation of a marginally stable arch or dome across most of the base area of the silo, so that the prime role of the unloader is to collect the loose material that falls from the underside of the dome, rather than the cutting of the compacted column of material. The end of the unloader should go only sufficiently close to the wall for it to undermine the edge of the arch or dome just enough to allow more material to drop therefrom. In such an arrangement only the tip of the unloader is cutting the dense material and the power requirement is minimised as most of the energy required to break up the mass of material comes from its own weight as it descends in the silo. The gradual descent of the mass ensures that with each pass of the cutter new material has settled into position to be cut.

The ideal situation outlined above is not easy to achieve with currently available unloaders which have no simple method of adjustment. If the cutter length is too long the whole dome collapses and the cutter has to work in dense material. If the unloader arm is too short the output rate falls since the material can form a stable dome or arch.

It is an object of the invention to provide an arrangement in which the problems outlined above are at least mitigated.

DISCLOSURE OF INVENTION

From one aspect the present invention provides the combination of a storage silo and a bottom unloader therefor wherein the base of the silo is formed as a hopper having a substantially central discharge outlet the unloader being arranged to project into the silo through the discharge outlet and comprising a sweep arm pivoted for rotation in the hopper about a vertical axis disposed centrally of the discharge outlet and for vertical movement away from the surface of the hopper.

From another aspect the invention provides the combination of a storage silo and a bottom unloader therefor wherein the base of the silo is formed as a hopper having a substantially central discharge outlet, the unloader comprising a sweep arm arranged to project into the silo through the discharge outlet and means for varying the effective length of the arm comprising a mounting supporting the arm for pivotal movement about a vertical axis disposed centrally of the discharge outlet, the mounting being arranged such that the length of the arm projecting into the silo can be altered.

Preferably the invention provides the combination of a storage silo and bottom unloader therefor wherein the base of the silo is formed as a hopper having a substantially central discharge outlet the unloader being arranged to project into the silo through the discharge outlet and comprising a sweep arm pivoted for rotation in the hopper about a vertical axis disposed centrally of the discharge outlet and for vertical movement away from the surface of the hopper and means for varying the effective length of the arm comprising a mounting supporting the arm for pivotal movement about the centrally disposed vertical axis the mounting arrangement being such that the length of the arm projecting into the silo can be altered. Preferably the hopper extends over substantially the whole of the base of the silo and advantageously is conical in shape. The angle of the cone of the hopper will be chosen to suit the particular material to be stored but because of the assistance provided by the unloader can be substantially less than would be expected of a conventional hopper which must have a sufficiently steep angle to self empty. An important feature of the hopper is that there must be sufficient slope for the sweep arm to be withdrawn through the central discharge outlet. The term 'hopper' as used in the specification and claims is to be construed accordingly.

Normally the unloader is mounted in a chamber below the silo. Means may be provided in the chamber for rotating the arm and for moving it vertically. Preferably the vertical movement is an angular movement about a central pivot.

The sloping of the floor of the silo to form a hopper with a central discharge outlet permits the unloader to be introduced and withdrawn into the silo through the discharge outlet thus rendering the unloader accessible for maintenance and repair. Such an arrangement also permits adjustment of the effective length of the unloader so as to permit unloading with relatively low power consumption. The hopper bottom of the silo is a basically strong structural form whether it is of steel restrained by a ring beam or of reinforced concrete or composite double wedge construction. The central unloading of the silo together with a concentric undercutting of material within the silo renders more predictable the loads on the structure of the silo making the silo design cheaper and simpler.

With the wetter longer chopped silages it is possible for the material to form a stable arch or dome across the whole silo diameter. When the cutter length is at its maximum the edge material supporting the arch or dome becomes progressively denser giving extremely high local lateral loads. To avoid such high lateral loads unloading is commenced with the arm at its minimum length and the unloader arm is progressively lengthened to leave a thin 'wall' of silage adjacent to the silo wall and is then angled up into the underside of the arch or dome until the band becomes unstable and slowly collapses. The provision of a fillet in the form of a steeply sloping between the hopper bottom and the vertical silo wall may assist the process.

While the unloader configuration may allow the effective length of the arm to be adjusted continuously it may be simpler and more robust to provide a limited range of settings.

The sweep arm may be mounted on a floor stand in a chamber below the silo, independent of the hopper, and incorporating the motor drive etc. Alternatively the sweep arm may be mounted on a floor stand in the chamber but with a hopper reinforcing ring being used to steady and drive the cutter assembly. Alternatively again the sweep arm may be suspended from the hopper.

The sweep arm may comprise one or more vibrating or reciprocating bars; this is simple but is only really suitable for materials with hesitant flow properties which only require small energy inputs to keep them on the move. However vibration enables shallow hoppers to self empty. The vibrating or reciprocating bars may also be arranged to aerate the material in the silo. Alternatively the sweep arm may be an auger. This is simpler than a chain cutter. The size and variation of pitch can be adjusted to suit the material to be stored. An auger can work with well chopped silage and other fibrous materials but it is best with granular/cohesive materials. Alternatively the sweep arm can be a chain cutter since such will handle any material, though with silage it prefers it chopped. The sweep arm may either be a free cantilever unsupported on the hopper floor or may be partly skid-supported on the hopper surface.

Steel hoppers are strong and light but require a strong ring beam especially if they have a shallow angle. Reinforced concrete hoppers can either be fairly massive but lightly reinforced or of more heavily reinforced twin wedge configuration. Composite hoppers of fabricated steel which can be assembled on site and then filled with concrete may be attractive since this arrangement would avoid the need for complex concrete formwork.

With materials which can on occasions flow freely, a large central outlet in the hopper could produce uncontrolled flow. This can be obviated either by fitting a cone on the unloader above the outlet or by controlling the discharge below the unloader. With this type of material the unloader could be used when free flow stopped. However continuous use of the unloader would give more controlled discharge and would prevent "rat-holing". Powders can 'flood' if they become fluidised and for these control below the unloader would be necessary.

BRIEF DESCRIPTION OF DRAWINGS

The invention is diagrammatically illustrated by way of example in the accompanying drawings in which.

BEST MODE OF CARRYING OUT THE INVENTION

Figure 1:
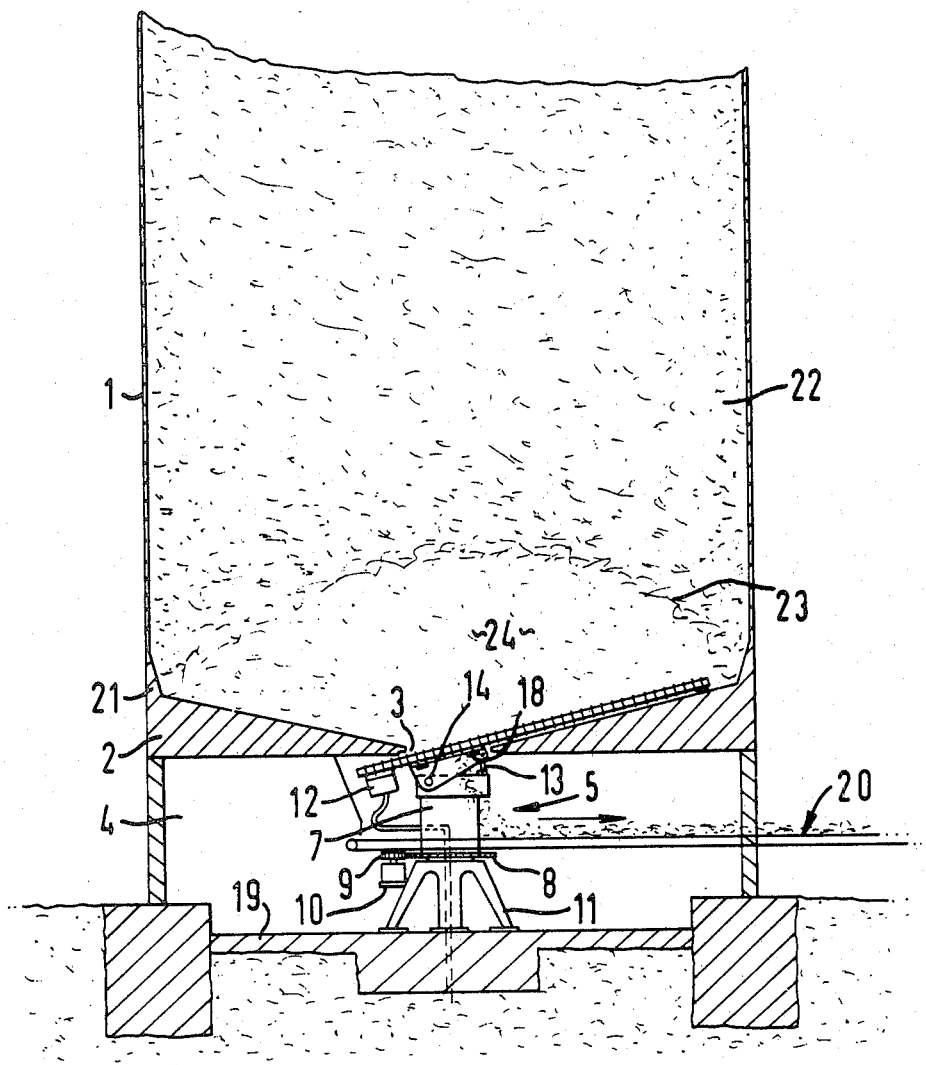
FIG. 1 is a cross-sectional side elevation through the base of a hopper bottomed storage silo equipped with a centrally mounted sweep arm unloader.
Figure 2:
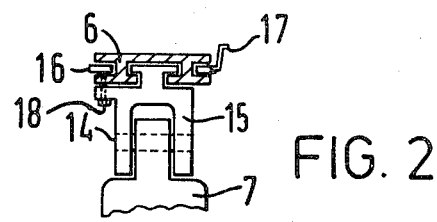
FIG. 2 is a scrap section on the line X—X of FIG. 1.
Figure 3:
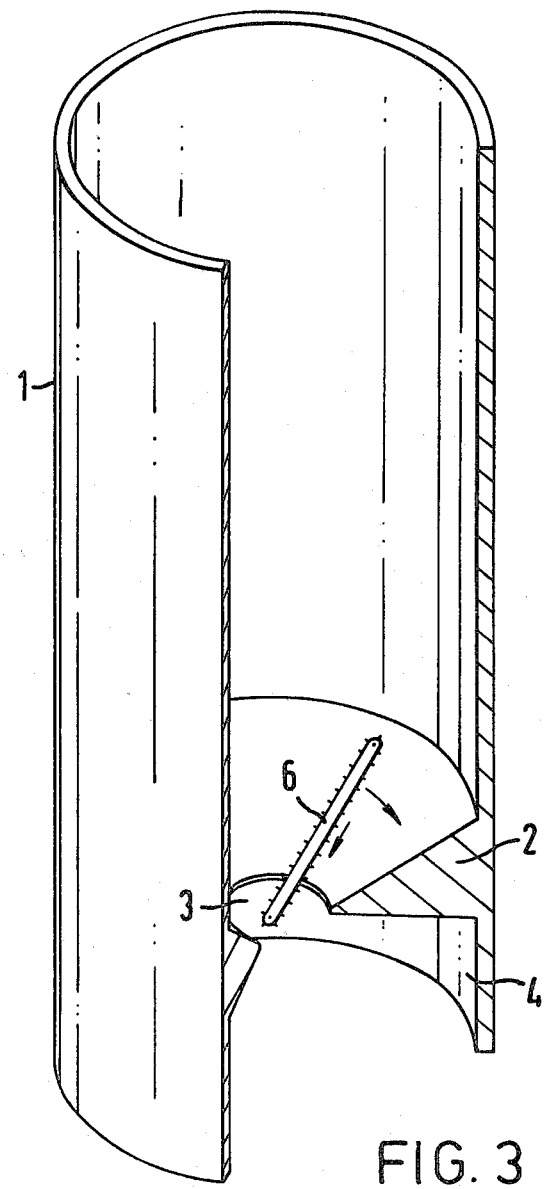
FIG. 3 is a partly sectioned perspective view of a storage silo.

In the drawings FIGS. 1 to 3 show diagrammatically a cylindrical storage silo 1 formed at its base with a conical hopper 2 having a central discharge outlet 3. A chamber 4 through which the contents of the silo can be removed is disposed below the hopper 2. An unloader 5 is disposed centrally of the discharge outlet 3 on a mounting 11 on the floor 19 of the chamber 4. The unloader comprises a body 7 pivotally mounted on the stationary support 11, the body carrying at its upper end a sweep arm conveyor 6 which projects into the silo through the discharge outlet. The sweep arm 6 is mounted on the body 7 by means of a forked member 15 which is clamped to its lower surface near its rear end and which straddles and is pivoted to a tongue-like upward extension of the body 7 by means of a pin 14. The sweep arm 6 thus projects into the silo through the discharge outlet 3 and is arranged to lie generally parallel to the floor of the hopper 2 so that it can be rotated in the hopper to remove material from the silo through the discharge outlet. The sweep arm conveyor is driven in rotation by means of a motor 10 (e.g. an hydraulic motor) mounted on the stand 11 which drives a gear 9 which in turn engages a ring gear 8 fixed to the body 7. In the present embodiment the sweep arm 6 has an endless chain 16 trained around its periphery which chain carries cutters 17 which cut and remove material from the silo, the chain 16 being driven in rotation by means of a motor 12 (e.g. an hydraulic motor) mounted on the rearward end of the arm 6. Bolts 18 by means of which the forked member 15 is clamped to the arm 6 permit the length of the arm 6 projecting into the silo through the discharge outlet to be altered as desired. Also the pivotal mounting of the sweep arm on the body 7 by means of pin 14 permits the sweep arm to be moved in a generally vertical plane away from the floor of the hopper, the inclination of the sweep arm being controlled by means of a screw jack 13.

Figure 4A:
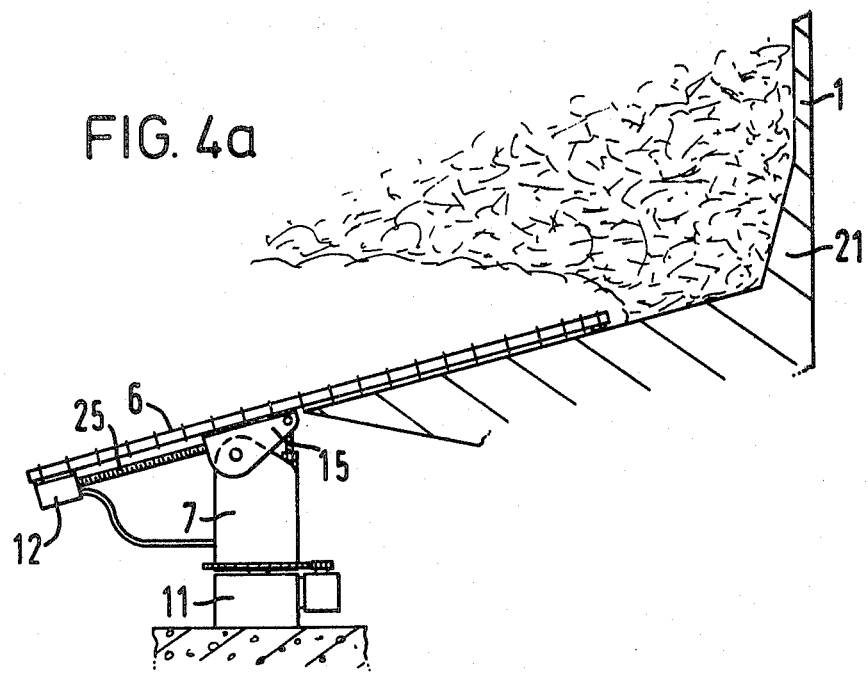
FIGS. 4a to 4c are scrap sectional side views of the base of the silo of FIG. 1 showing the unloader in different positions of operation.
Figure 4B:
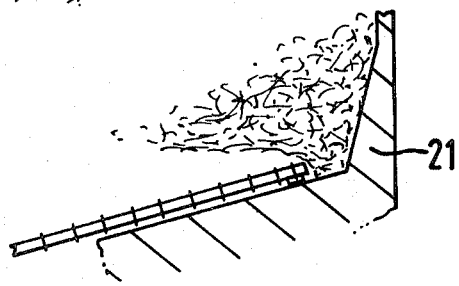
Figure 4C:
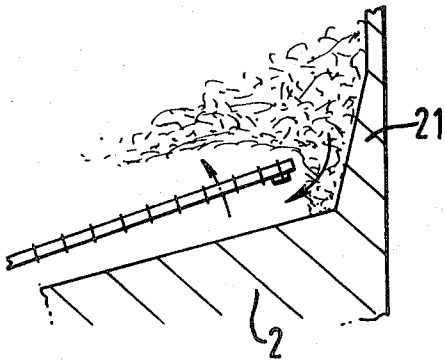

As shown in FIG. 4 of the drawings the length of the sweep arm projecting into the silo may be adjusted as desired to minimise the power requirements in removing dense materials such as silage from the silo. In this connection FIG. 1 of the drawings illustrates a situation in which the silo contains a mass of silage 22 which will weigh many tonnes and can thus tend to trap the sweep arm unloader. It will be seen that the wall of the silo at the junction between the hopper and the silo proper is inclined upwardly at a steep angle to form a fillet 21 to facilitate the creation of a semistable dome or arch of compacted silage over the sweep arm which can be made to collapse in a controlled manner by operation of the sweep arm so that the power requirement in operating the unloader is minimised. Reference 24 indicates an area of loose silage below the dome of compacted silage 23. Initially the sweep arm is operated partly retracted and as more material is removed from the silo the arm is gradually lengthened until it approaches the arch creating fillet 21 where the silage can be expected to be at maximum density. If the dome or arch of silage fails to collapse into the area 24 where it can readily be removed from the silo the arm can be pivoted upwardly as indicated in FIG. 4c to cause the collapse. To prevent damage to the arm which may be caused by the sudden collapse of the arch when the arm is raised away from the floor of the hopper by means of the screw jack 13 we prefer that the arm is resiliently biased upwardly so that it is free to pivot downwardly into contact with the floor of the hopper under the weight of silage collapsing on the arm. As shown in FIG. 4a of the drawings the adjustment of the working length of the cutter arm 6 may be effected by way of a screw 25 instead of by means of the clamp shown in FIGS. 1 and 2. The material in the silo is conveyed by the cutters 17 on the chain 16 to the central discharge outlet 3 where it drops onto a conveyor 20 for removal from the silo.

Figure 5A:
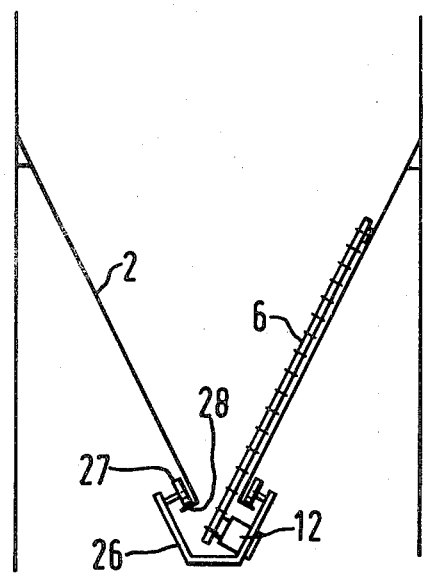
FIGS. 5a to 5e show five alternative forms of the base of the storage silo.

Referring to FIG. 5a of the drawings there is shown a silo having a steeply inclined hopper defining a central discharge outlet and from which hopper the unloader 6 is suspended. The extremity of the hopper carries an outwardly extending annular flange 28 which forms a track for a carriage 26 which is supported for rotation on wheels 27 on the track 28. The carriage 26 supports the unloader 6 for lengthwise adjustment and for pivtol movement away from the surface of the hopper in the manner described in FIGS. 1 to 3. Rotation of the unloader may be achieved by a circular rack and pinion device.

Figure 5B:
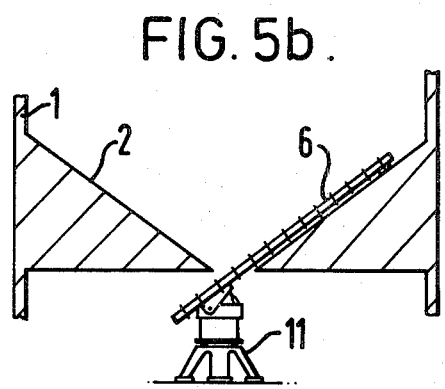

In FIG. 5b of the drawings there is shown an arrangement of the kind described with reference to FIGS. 1 to 3 with the exception that the hopper is of a more pronounced slope.

Figure 5C:
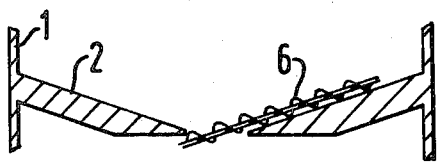

With reference to FIG. 5c of the drawings there is shown an arrangement of the kind shown with reference to FIGS. 1 to 3 of the drawings except that the unloader comprises a screw auger instead of a cutter chain.

Figure 5D:
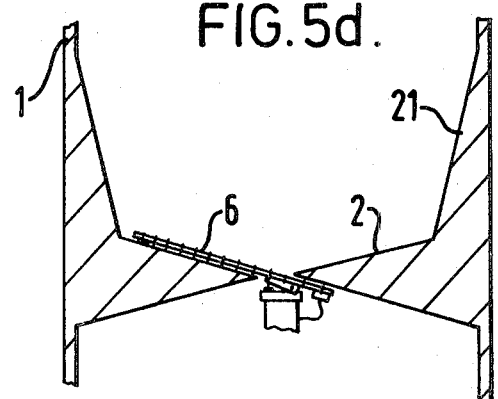

In FIG. 5d of the drawings there is shown an arrangement of the kind generally described above except that the transitional area or fillet 21 between the vertical wall 1 and the hopper 2 is more pronounced than that described above.

Figure 5E:
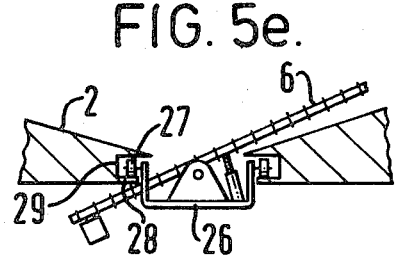

In FIG. 5e of the drawings there is shown an arrangement generally similar to that of FIG. 4a but modified for use with a relatively shallow hopper. In this embodiment the track 28 is formed by the lower flange of an annular channel member 29 surrounding the discharge outlet 3 of the hopper.

INDUSTRIAL APPLICABILITY

It will be appreciated that in each of the embodiments described above the sweep arm of the unloader can be removed from the silo through the discharge outlet for maintenance and repair and can in simple manner be extended or retracted to suit the particular operating conditions prevailing within the silo and can in simple manner be moved vertically should the operating conditions demand it.

I claim:

1. The combination of storage silo and a bottom unloader therefor, said silo having a base formed as a hopper provided with a substantially central discharge outlet, a chamber located below said base, said unloader being mounted in said chamber and arranged to project into the silo through the discharge outlet and comprising a sweep arm mounted for rotation in the hopper about a vertical axis centrally of the discharge outlet and for vertical movement away from the surface of the hopper, means in said chamber for rotating the sweep arm about the vertical axis and means in said chamber disposed adjacent to the vertical axis for moving the sweep arm vertically and for maintaining said sweep arm spaced away from the surface of the hopper during operation thereof.

2. The combination according to claim 1, including means for varying the effective length of the sweep arm, the means comprising a mounting supporting the arm for pivotal movement about a vertical axis, the mounting being arranged such that the length of the arm projecting into the silo can be altered.

3. The combination of claim 1, wherein the hopper extends over substantially the whole of the base of the silo.

4. The combination of claim 1, wherein the hopper is conical in shape.

5. The combination of claim 1, including means in the chamber for moving the arm longitudinally.

6. The combination of claim 1, wherein the sweep arm is mounted on a centrally disposed pivot for vertical angular movement.

7. The combination of claim 1, wherein the wall of the silo at its junction with the hopper is formed with means tending to create a marginally stable arch or dome of silage.

8. The combination according to claim 7, wherein the means tending to create the marginally stable arch or dome of silage is a steeply inclined fillet disposed between the hopper and a vertical wall of silo.

9. A bottom unloader for a storage silo having a base formed as a hopper, and a chamber below said hopper, said unloader comprising a sweep arm, means in said chamber supporting said sweep arm and for driving the sweep arm in rotation about a substantially vertical axis, conveying means on the sweep arm, means mounted on the arm for actuating the conveying means, and means disposed in said chamber adjacent to the substantially vertical axis for moving the sweep arm vertically away from the surface of the hopper during operation thereof, and for maintaining said sweep arm spaced from the surface of said hopper during operation.

10. A bottom unloader according to claim 9, including a mounting about which the sweep arm can rotate about the vertical axis and about which the sweep arm can pivot in a substantially vertical plane.

11. A bottom unloader according to claim 10, including means for altering the working length of the sweep arm.

* * * * *